(12) United States Patent
Matsumoto et al.

(10) Patent No.: US 8,189,127 B2
(45) Date of Patent: May 29, 2012

(54) INPUT DEVICE

(75) Inventors: Kenichi Matsumoto, Osaka (JP); Koji Tanabe, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/017,492

(22) Filed: Jan. 22, 2008

(65) Prior Publication Data

US 2008/0204611 A1 Aug. 28, 2008

(30) Foreign Application Priority Data

Feb. 22, 2007 (JP) ................................. 2007-041894

(51) Int. Cl.
*G02F 1/1335* (2006.01)
(52) U.S. Cl. .......................................... 349/12; 349/117
(58) Field of Classification Search .................... 349/12, 349/96, 117, 118, 119, 120, 121
See application file for complete search history.

(56) References Cited

U.S. PATENT DOCUMENTS

| | | | | |
|---|---|---|---|---|
| 6,020,945 A | * | 2/2000 | Sawai et al. | 349/119 |
| 6,369,865 B2 | * | 4/2002 | Hinata | 349/12 |
| 6,411,344 B2 | * | 6/2002 | Fujii et al. | 349/12 |
| 6,611,299 B1 | * | 8/2003 | Fujii et al. | 349/12 |
| 7,268,311 B2 | | 9/2007 | Tanabe et al. | |
| 2005/0280635 A1 | * | 12/2005 | Hinata | 345/173 |
| 2006/0262255 A1 | * | 11/2006 | Wang et al. | 349/114 |

FOREIGN PATENT DOCUMENTS

| | | |
|---|---|---|
| CN | 1758206 A | 4/2006 |
| JP | 2006-107015 A | 4/2006 |

* cited by examiner

*Primary Examiner* — David Nelms
*Assistant Examiner* — David Y Chung
(74) *Attorney, Agent, or Firm* — RatnerPrestia

(57) ABSTRACT

According to the input device of the present invention, phase-difference plate (11) with ¼ wavelength is disposed on the top surface of upper substrate (1) of touch panel (12). As a result of passing through phase-difference plate (11), lamp-light 9a that illuminates LCD element (8) goes outside as outgoing-light 9c with a phase-shift of ¼ wavelength. With the structure above, a user wearing polarized sunglasses—even if they have an absorption axis in a direction the same as that of lamplight 9a—can easily recognize the displays shown by LCD element (8) on the back surface of touch panel (12). The structure offers a user-friendly input device with good visibility of LCD element (8).

1 Claim, 3 Drawing Sheets

INPUT DEVICE

TECHNICAL FIELD

The present invention relates an input device mainly used for electronic devices.

BACKGROUND ART

In recent years, there has been a growing trend to incorporate advanced various functions into electronic devices, such as mobile phones and car navigation systems. In such a trend, a touch panel has been widely employed for an input device of various electronic devices. For example, a light-transmissive touch panel is attached on the front surface of a liquid crystal display (LCD) element. A user presses a touch panel with a finger or stylus, while viewing letters, symbols and graphics shown by the LCD element on the back surface of the touch panel and selects a desired function. As the demand for a touch panel increases, manufacturers have sought a user-friendly touch panel with good visibility.

An input device employing a conventional touch panel will be described with reference to FIG. 5.

FIG. 5 is a sectional view of a conventional input device. For sake of clarity, the figure shows dimensions enlarged in the thickness direction.

The input device shown in FIG. 5 has LCD element 8 on which polarizing plate 7 is disposed, and touch panel 6. Touch panel 6 has upper substrate 1, lower substrate 2, upper conductive layer 3 and lower conductive layer 4. Substrates 1 and 2 are made of a light-transmissive film. Conductive layers 3 and 4 are also formed of light-transmissive material, such as indium-tin oxide. Upper conductive layer 3 is disposed on the bottom surface of upper substrate 1, and lower conductive layer 4 is disposed on the top surface of lower substrate 2. Conductive layers 3 and 4 are sandwiched between upper substrate 1 and lower substrate 2.

A plurality of dot spacers (not shown) are formed with insulating resin at predetermined spaced intervals on the top surface of lower conductive layer 4. A pair of upper electrodes (not shown) is formed at both ends of upper conductive layer 3; similarly, at both ends of lower conductive layer 4, a pair of lower electrodes (not shown) is formed in an arrangement perpendicular to the upper electrodes.

Frame-shaped spacer 5 is disposed between upper conductive layer 3 and lower conductive layer 4 to separate them. Spacer 5 has an adhesive layer (not shown) coat-formed on the top and bottom surfaces or either one of the surfaces, by which the peripheries of upper substrate 1 and lower substrate 2 are bonded with each other. Upper conductive 3 faces lower conductive layer 4 at predetermined spaced intervals.

Such structured touch panel 6 is disposed on LCD element 8 through polarizing plate 7 and mounted on an electronic device. Each pair of upper electrodes and lower electrodes is connected, via a connector and a lead wire (not shown), to the electronic circuit (not shown) of the electronic device. Now will be described how such structured touch panel works. A user presses the top surface of upper substrate 1 with a finger or stylus, while viewing the displays shown by LCD element 8 on the back surface of touch panel 6. The application of depressing force depresses down upper substrate 1, allowing a position of upper conductive layer 3 corresponding to the depressed position to make contact with lower conductive layer 4. Through the connection of the conductive layers, voltage is applied to the upper electrodes and the lower electrodes from the electric circuit. The electronic circuit detects the depressed position from voltage ratio between the electrodes. The electronic device thus recognizes the user's selection and switches to the desired function.

In the operation above, lamplight 9 illuminates the displays, such as letters, symbols and graphics, shown by LCD element 8. Here, suppose that polarizing plate 7 disposed on LCD element 8 absorbs Y-directional light wave perpendicular to X-directional light wave. In this case, the lamplight 9 changes to X-directional linearly polarized lamplight 9a and exits as X-directional linearly polarized output light 9b from the top surface of substrate 1.

Suppose that a user puts on smoked sunglasses for blocking reflected light and operates the touch panel in direct sunlight. In this case, although the visibility is lowered, the user can recognize the displays of LCD element 8. However, if the sunglasses are polarized sunglasses that absorb X-directional polarized light wave, the user cannot recognize the displays of LCD element 8 illuminated by X-directional linearly polarized output light 9b. This can cause a problematic situation when the user operates the touch panel in the driver's seat under the glares of sunlight in midsummer.

For example, Japanese Patent Unexamined Publication No. 2006-107015 is known in a prior-art reference relating to the present invention.

According to the conventional input device, as described above, when the user operates touch panel 6 with the use of polarized sunglasses, a problem arises; if the polarized sunglasses absorb light wave having a direction the same as the direction in which lamplight 9 is polarized by polarizing plate 7, the user cannot recognize the displays of LCD element 8.

SUMMARY OF THE INVENTION

The present invention addresses the problem above. It is therefore the object of the present invention to provide an input device with good visibility, even in the operations with the use of polarized sunglasses.

The input device of the present invention has a light-transmissive upper substrate with an upper conductive layer disposed on the bottom surface, a light-transmissive lower substrate with a lower conductive layer disposed on the top surface so as to face the upper conductive layer at predetermined spaced intervals, and a liquid crystal display (LCD) element disposed below the lower substrate. In addition, a phase-difference plate with ¼ wavelength is disposed on the top surface of the upper substrate or on the bottom surface of the lower substrate.

According to the present invention, a touch panel as a part of an input device, which is formed of an upper substrate and a lower substrate, has a phase-difference plate with ¼ wavelength disposed on the top surface of the upper substrate or on the bottom surface of the lower substrate. By virtue of the phase-difference plate with ¼ wavelength, lamplight that illuminates the LCD element undergoes the change of polarization characteristics and goes out as light with a phase-shift of ¼ wavelength. This provides a user with good visibility of the LCD element disposed on the back surface of the touch panel, even when the user wears polarized sunglasses that absorb light wave having an absorption axis in a direction of the same as that of the lamplight.

That is, as an advantageous effect, the present invention offers a user-friendly input device with good visibility.

Figure 1:
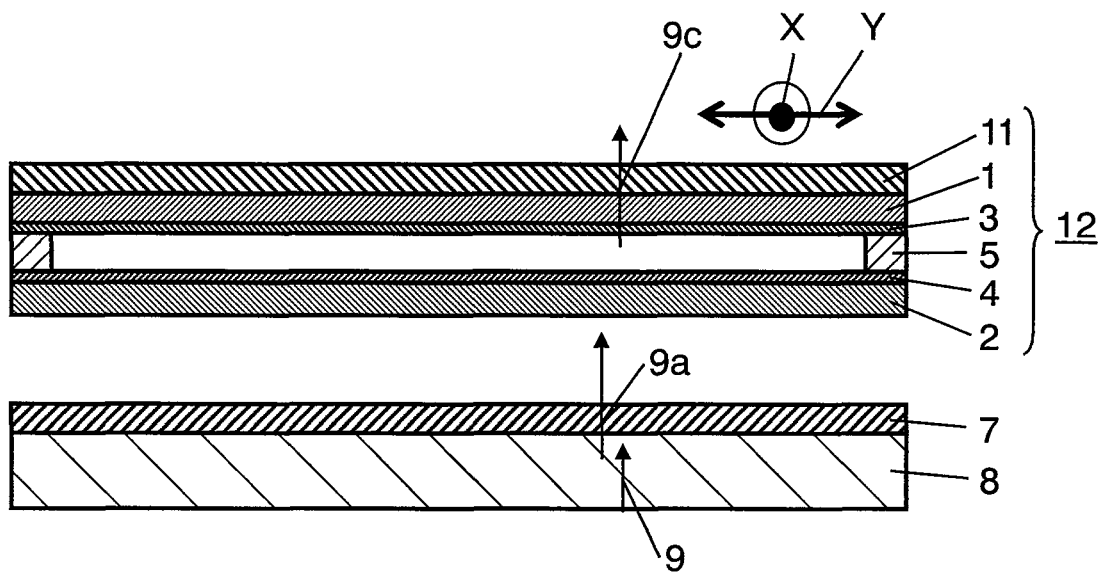
FIG. 1 is a sectional view of an input device of an exemplary embodiment of the present invention.

REFERENCE MARKS IN THE DRAWINGS 1 upper substrate
2 lower substrate
3 upper conductive layer
4 lower conductive layer
5 spacer
7 polarizing plate
8 liquid crystal display (LCD) element
9, 9a lamplight
9c outgoing-light
11, 14 phase-difference plate
12, 13 touch panel

DETAILED DESCRIPTION OF THE PREFERRED EMBODIMENTS

Hereinafter will be described the structure of an exemplary embodiment of the present invention with reference to FIG. 1 and FIG. 2. For easy understanding of the structure, each figure shows dimensions enlarged in the thickness direction. Through the figures, like parts have similar reference marks and the description thereof will be omitted.

Exemplary Embodiment

FIG. 1 is a sectional view of an input device of an exemplary embodiment of the present invention. The input device of FIG. 1 has light-transmissive upper substrate 1 and light-transmissive lower substrate 2. Upper substrate 1 is formed into a film made of polyethersulfone, polycarbonate or the like. Lower substrate 2 is made of glass, acrylic resin, polycarbonate or the like. Upper conductive layer 3 is formed on the bottom surface of upper substrate 1 and lower conductive layer 4 is formed on the top surface of lower substrate 2 by sputtering, both of which are light-transmissive layers made of indium-tin oxide, tin oxide or the like.

A plurality of dot spacers (not shown), which are made of insulating resin, such as epoxy and silicone, are formed at predetermined spaced intervals on the top surface of lower conductive layer 4. A pair of upper electrodes (not shown) made of silver, carbon, or the like is formed at both ends of upper conductive layer 3. A pair of lower electrodes (not shown) is formed at the both ends of lower conductive layer 4 in an arrangement perpendicular to the upper electrodes.

Frame-like spacer 5 is made of epoxy, polyester, or the like. The outer peripheries of upper substrate 1 and lower substrate 2 are bonded by an acrylic or rubber bonding-layer (not shown) that is coat-formed on at least either one of the top and bottom surfaces of spacer 5. Spacer 5 allows upper conductive layer 3 and lower conductive layer 4 to face at predetermined spaced intervals.

In addition, phase-difference plate 11, which serves as a phase-difference plate with ¼ wavelength, is an oriented film having birefringence made of polycarbonate or a cycloolefin-based polymer. Such structured phase-difference plate 11 is bonded to the top surface of upper substrate 1 by an adhesive (not shown). Touch panel 12 is thus completed.

Such structured touch panel 12 is disposed on LCD element 8 through polarizing plate 7 and mounted on an electronic device. Each pair of upper electrodes and lower electrodes is connected, via a connector and a lead wire (not shown), to the electronic circuit (not shown) of the electronic device.

To select a desired function, a user presses the top surface of phase-difference plate 11 with a finger or stylus, while viewing the displays shown by LCD element 8 on the back surface of touch panel 12. The application of the depressing force depresses down a position of phase-difference plate 11 and upper substrate 1, allowing a position of upper conductive layer 3 corresponding to the depressed position to make contact with lower conductive layer 4. Through the connection of the conductive layers, voltage is applied to the upper electrodes and the lower electrodes from the electric circuits. The electronic circuit detects the depressed position from voltage ratio between the electrodes. The device thus recognizes the user's selection and switches to the desired function.

Here, suppose that polarizing plate 7 disposed on LCD element 8 absorbs Y-directional light wave perpendicular to X-direction light wave. In this case, the lamplight 9 illuminating LCD element 8 changes to X-directional linearly polarized lamplight 9a and passes through upper substrate 1. Phase-difference plate 11 disposed on upper substrate 1 provides lamplight 9a with a phase-shift of ¼ wavelength. As a result, lamplight 9a goes outside as outgoing-light 9c with a phase-shift of ¼ wavelength.

That is, a user wearing sunglasses for blocking reflected light in direct sunlight—even if they are polarized sunglasses that absorb light wave having an absorption axis in a direction the same as that of lamplight 9a—can easily recognize the displays shown by LCD element 8 on the back surface of touch panel 12.

As described above, the structure of the embodiment has phase-difference plate 11 with ¼ wavelength on the top surface of upper substrate 1. This provides lamplight 9 with a phase-shift of ¼ wavelength, so that lamplight 9 goes outside as outgoing-light 9c with a phase-shift of ¼ wavelength. With the structure above, a user wearing polarized sunglasses—even if they have an absorption axis in a direction the same as that of lamplight 9a—can easily recognize the displays shown by LCD element 8, since outgoing-light 9c has a phase-shift of ¼ wavelength. The structure of the embodiment offers a user-friendly input device having touch panel 12 with good visibility of LCD element 8.

Figure 2:
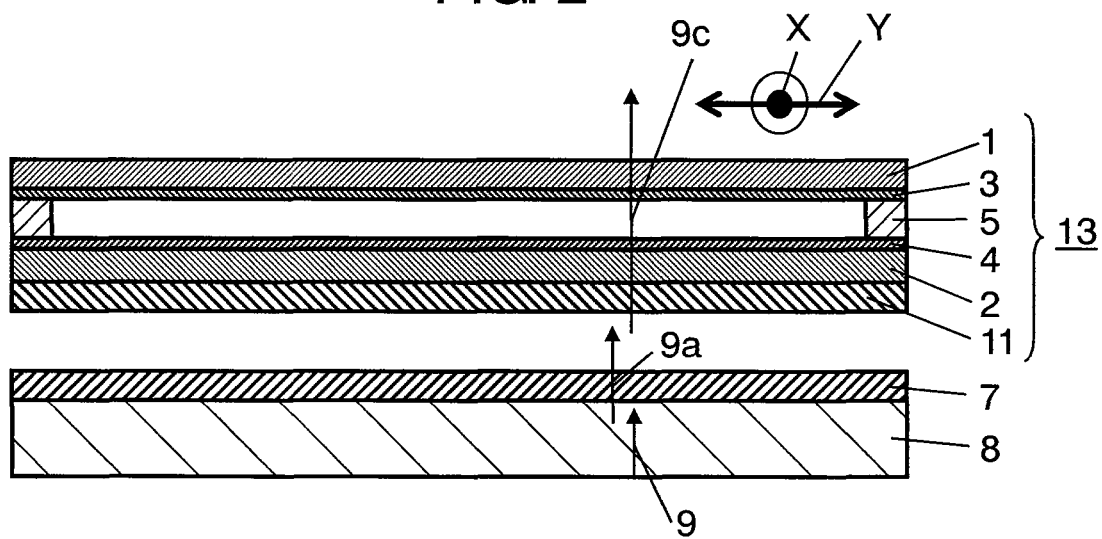
FIG. 2 is a sectional view of another example of the input device of the exemplary embodiment.

FIG. 2 is a sectional view of another example of the input device of the exemplary embodiment. The structure of FIG. 2 differs from that of FIG. 1 in that phase-difference plate 11 with ¼ wavelength is disposed on the bottom surface of lower substrate 2 of touch panel 13.

With the structure above, as is the same as the structure in FIG. 1, a user wearing polarized sunglasses—even if they have an absorption axis in a direction the same as that of lamplight 9a—can easily recognize the displays shown by LCD element 8, since outgoing-light 9c has a phase-shift of ¼ wavelength. That is, phase-difference plate 11 with ¼ wavelength, which is disposed on the bottom surface of lower substrate 2 of touch panel 13, allows lamplight 9 to go outside as outgoing-light 9c with a phase-shift of ¼ wavelength. The structure of FIG. 2, as is the same as that in FIG. 1, offers a user-friendly input device having touch panel 13 with good visibility of LCD element 8.

Figure 3:
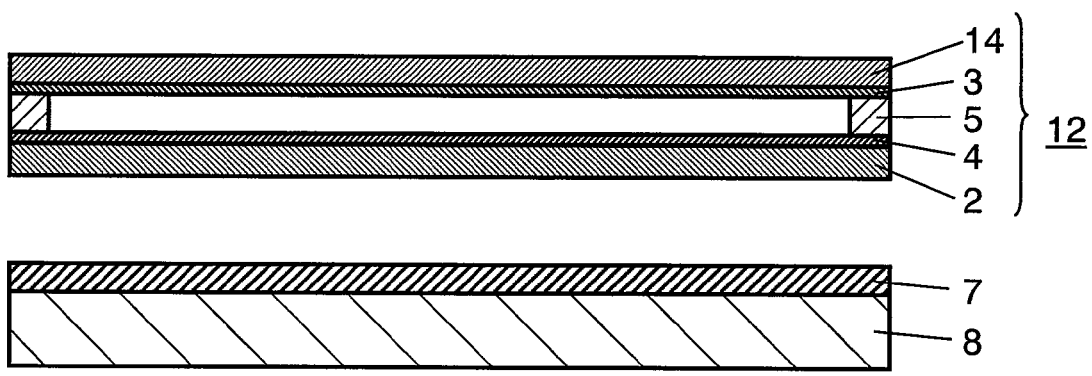
FIG. 3 is a sectional view of the input device of another exemplary embodiment.

FIG. 3 is a sectional view of an input device of another exemplary embodiment of the present invention. The structure above has no phase-difference plate 11 that is used in touch panel 12 in FIG. 1, and the upper substrate of the structure is an oriented film having birefringence made of polycarbonate or a cycloolefin polymer. That is, the upper substrate serves as phase-difference plate 14 with ¼ wavelength. Like the structures in FIGS. 1 and 2, the input device in FIG. 3 offers good visibility. As another advantage, the structure decreases parts count and accordingly the production cost of the input device.

Figure 4:
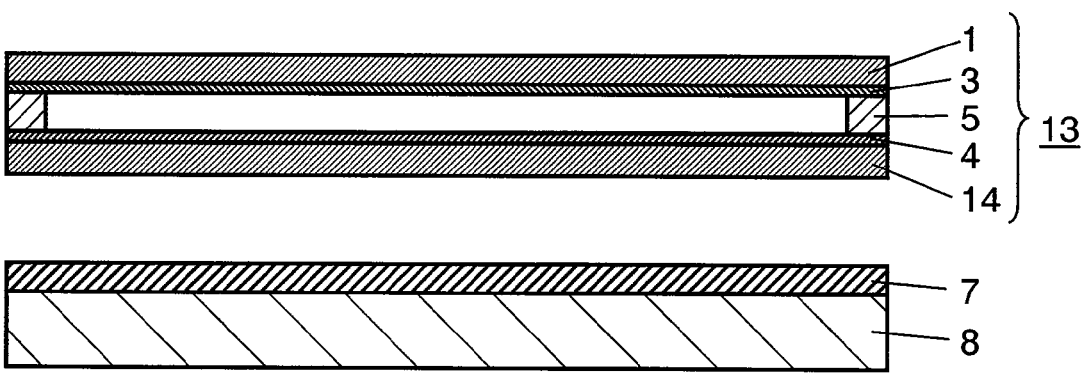
FIG. 4 is a sectional view of another example of the input device of another exemplary embodiment.
Figure 5:
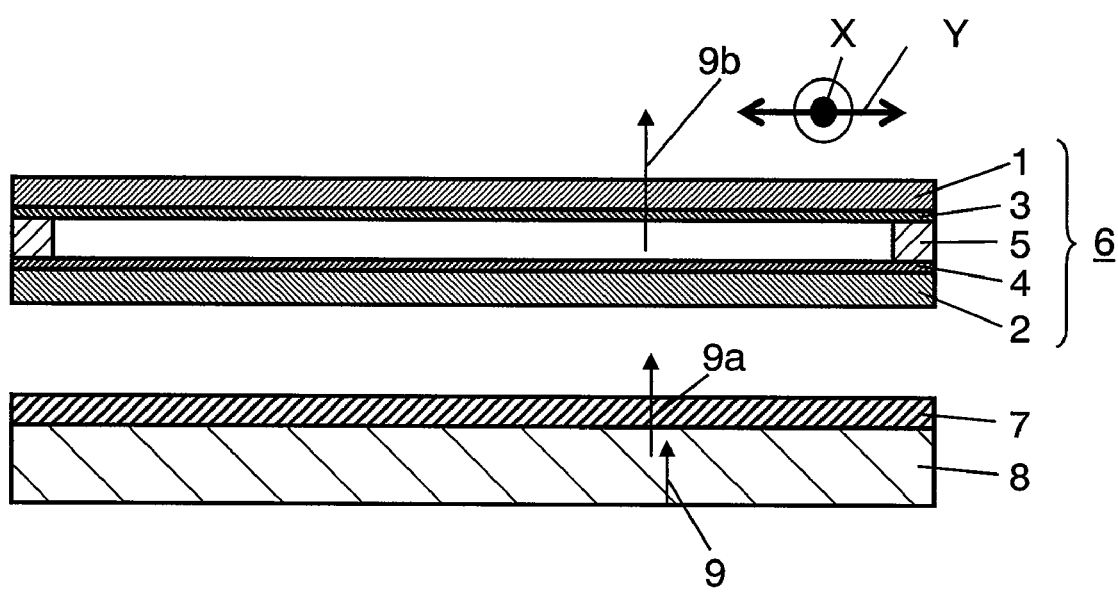
FIG. 5 is a sectional view of a conventional input device.

FIG. 4 is a sectional view of another example of an input device of another exemplary embodiment of the present invention.

The structure above has no phase-difference plate 11 that is used in touch panel 13 in FIG. 2, and the lower substrate of the structure is an oriented film having birefringence made of polycarbonate or a cycloolefin polymer. That is, the lower substrate serves as phase-difference plate 14 with ¼ wavelength. Like the structures in FIGS. 1 and 2, the input device in FIG. 4 offers good visibility. As another advantage, eliminating phase-difference plate 11 decreases parts count and accordingly the production cost of the input device.

The input device of the present invention is effective in enhancing visibility and operability, at the same time, decreasing the production cost. It is useful in providing an operation panel for various electronic devices.

The invention claimed is:

1. An input device for use by a user wearing a polarized glass comprising:
   a touch panel having a light-transmissive upper substrate with an upper conductive layer disposed on a bottom surface of the light-transmissive upper substrate, and a light-transmissive lower substrate with a lower conductive layer disposed on a top surface of the light-transmissive lower substrate so as to face the upper conductive layer at predetermined spaced intervals;
   a liquid crystal display element disposed below the light-transmissive lower substrate; and
   a polarizing plate disposed between the lower conductive layer and the liquid crystal display element,
   wherein at least any one of the light-transmissive upper substrate and the light-transmissive lower substrate is formed as a phase-difference plate with ¼ wavelength so that the phase-difference plate with ¼ wavelength is located close to the touch panel and over the polarizing plate,
   wherein the input device is absent a polarizing plate disposed over the phase-difference plate,
   the phase-difference plate provides outgoing-light with a phase-shift of ¼ wavelength,
   a polarization direction of the polarizing plate is different from a polarization direction of the polarized glass, and
   an outgoing-light from the liquid crystal display element changes to a circular polarized light, allowing the displays of the liquid crystal display element to be recognized even when a polarization direction of the polarizing plate has an absorption axis in the same polarization direction of the polarized glass.

\* \* \* \* \*